US012644703B2

(12) United States Patent
Katsaros

(10) Patent No.: US 12,644,703 B2
(45) Date of Patent: Jun. 2, 2026

(54) LEVEL WITH CAPTURED MAGNETIC STRIP

(71) Applicant: Apex Brands, Inc., Apex, NC (US)

(72) Inventor: Anthony Katsaros, Durham, NC (US)

(73) Assignee: Apex Brands, Inc., Apex, NC (US)

( * ) Notice: Subject to any disclaimer, the term of this patent is extended or adjusted under 35 U.S.C. 154(b) by 355 days.

(21) Appl. No.: 18/277,476

(22) PCT Filed: Feb. 14, 2022

(86) PCT No.: PCT/US2022/016257
§ 371 (c)(1),
(2) Date: Aug. 16, 2023

(87) PCT Pub. No.: WO2022/177837
PCT Pub. Date: Aug. 25, 2022

(65) Prior Publication Data
US 2024/0133689 A1 Apr. 25, 2024
US 2024/0230331 A9 Jul. 11, 2024

Related U.S. Application Data

(60) Provisional application No. 63/149,827, filed on Feb. 16, 2021.

(51) Int. Cl.
*G01C 9/28* (2006.01)
*G01C 9/34* (2006.01)
(52) U.S. Cl.
CPC ...... *G01C 9/28* (2013.01); *G01C 9/34* (2013.01)
(58) Field of Classification Search
CPC .................................. G01C 9/28; G01C 9/34
USPC .......................................... 33/347, 370, 371
See application file for complete search history.

(56) References Cited

U.S. PATENT DOCUMENTS

| | | | | |
|---|---|---|---|---|
| 2,695,949 A | * | 11/1954 | Ashwill | G01C 9/32 33/DIG. 1 |
| 3,820,249 A | * | 6/1974 | Stone | G01C 9/24 D10/69 |
| 3,832,782 A | * | 9/1974 | Johnson | G01C 9/28 33/351 |
| 4,168,578 A | * | 9/1979 | VanderWerf | G01C 9/28 33/382 |
| 4,506,450 A | * | 3/1985 | Fleming | G01C 9/06 33/366.12 |

(Continued)

FOREIGN PATENT DOCUMENTS

EP 3324151 B1 5/2018

OTHER PUBLICATIONS

International Search Report and Written Opinion from International Application No. PCT/US2022/016257 mailed May 26, 2022, all pages cited in its entirety.

*Primary Examiner* — George B Bennett
(74) *Attorney, Agent, or Firm* — Burr & Forman

(57) ABSTRACT

A level device may include a magnetic element, a vial assembly and a housing having a top face, a bottom face, a first end and a second end. The housing may include a capture element disposed at the bottom face or the top face. The vial assembly may include one or more spirit or bubble levels disposed in the housing to indicate conditions of level or plumb relative to orientation of the top or bottom faces. The magnetic element may be retained by the capture element. The magnetic element may be retained on six sides by the capture element.

20 Claims, 6 Drawing Sheets

(56) References Cited

U.S. PATENT DOCUMENTS

Figure 1:
Figure 1:
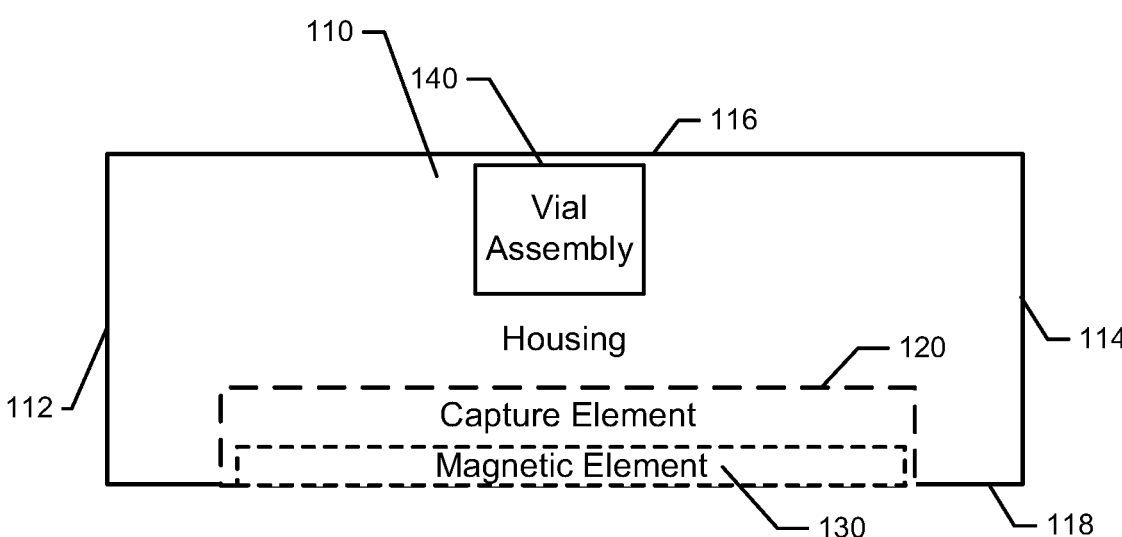

| | | | | |
|---|---|---|---|---|
| 6,029,360 | A * | 2/2000 | Koch | G01C 9/28 |
| | | | | 33/381 |
| 7,398,600 | B2 * | 7/2008 | Ming | G01C 9/28 |
| | | | | 33/379 |
| 7,552,540 | B2 * | 6/2009 | Ming | G01C 9/28 |
| | | | | 33/347 |
| 7,562,462 | B2 * | 7/2009 | Gentleman | G01C 9/28 |
| | | | | 33/372 |
| 8,621,760 | B2 * | 1/2014 | Norelli | G01C 9/28 |
| | | | | 33/DIG. 1 |
| 8,631,584 | B2 * | 1/2014 | Steele | H02G 1/00 |
| | | | | 33/528 |
| 9,228,832 | B2 * | 1/2016 | Steele | H02G 1/00 |
| 10,627,231 | B2 * | 4/2020 | Wilkes | G01C 9/28 |
| 11,137,239 | B2 * | 10/2021 | Riopel | G01B 5/245 |
| 11,713,966 | B2 * | 8/2023 | Brown | G01C 9/12 |
| | | | | 33/389 |
| 11,780,260 | B1 * | 10/2023 | McGee | B43L 13/028 |
| | | | | 33/474 |
| 2004/0040169 | A1 * | 3/2004 | Davis | B23D 59/002 |
| | | | | 33/640 |
| 2004/0050735 | A1 | 3/2004 | Coleman, Jr. et al. | |
| 2007/0234581 | A1 | 10/2007 | Ming et al. | |
| 2013/0152414 | A1 | 6/2013 | Steele et al. | |
| 2014/0373371 | A1 | 12/2014 | Silberberg | |
| 2024/0310170 | A1 * | 9/2024 | Palatshe | G01C 9/34 |

* cited by examiner

Heading

260

264

266

262

LEVEL WITH CAPTURED MAGNETIC STRIP

TECHNICAL FIELD

Example embodiments generally relate to angle measuring devices, and particularly relate to a spirit or bubble level that with a captured magnetic strip provided therein.

BACKGROUND

Measuring devices such as bubble levels (or spirit levels) have been around for a very long time, and are common measuring tools used in numerous contexts to obtain angular measurements or to ensure that surfaces are level or plumb. Most commonly, the bubble level is provided in a cylindrical vial, and the vial is attached to a flat surface so that when the bubble is in the center of the vial, the surface (which may be laid on another surface being measured for level or plumb) is known to be level. The attachment between the cylindrical vial and the flat surface is typically a fixed attachment. Level and plumb may therefore be measured by the same device with multiple vials provided with different angles (e.g., 90 degree rotation) relative to perpendicular flat surfaces.

Some levels are used in settings in which the measurement of level or plumb is needed for metallic pipes, studs or other components. In these settings, it is common for some form of magnetic element to be added to the structure of the level. The cheapest, and most common, way to do this has been to use an adhesive to attach a strip magnet to one side of the level. However, these devices are notorious for having the strip magnet peel off over time.

Accordingly, it may be desirable to improve device designs in order to provide a more robust and convenient solution for enabling levels to be used in connection with metallic components.

BRIEF SUMMARY OF SOME EXAMPLES

Some example embodiments may enable the provision of a level device. The level device may include a magnetic element, a vial assembly and a housing having a top face, a bottom face, a first end and a second end. The housing may include a capture element disposed at the bottom face or the top face. The vial assembly may include one or more spirit or bubble levels disposed in the housing to indicate conditions of level or plumb relative to orientation of the top or bottom faces. The magnetic element may be retained by the capture element. The magnetic element may be retained on six sides by the capture element.

BRIEF DESCRIPTION OF THE SEVERAL VIEWS OF THE DRAWING(S)

Figures 2A, 2B:
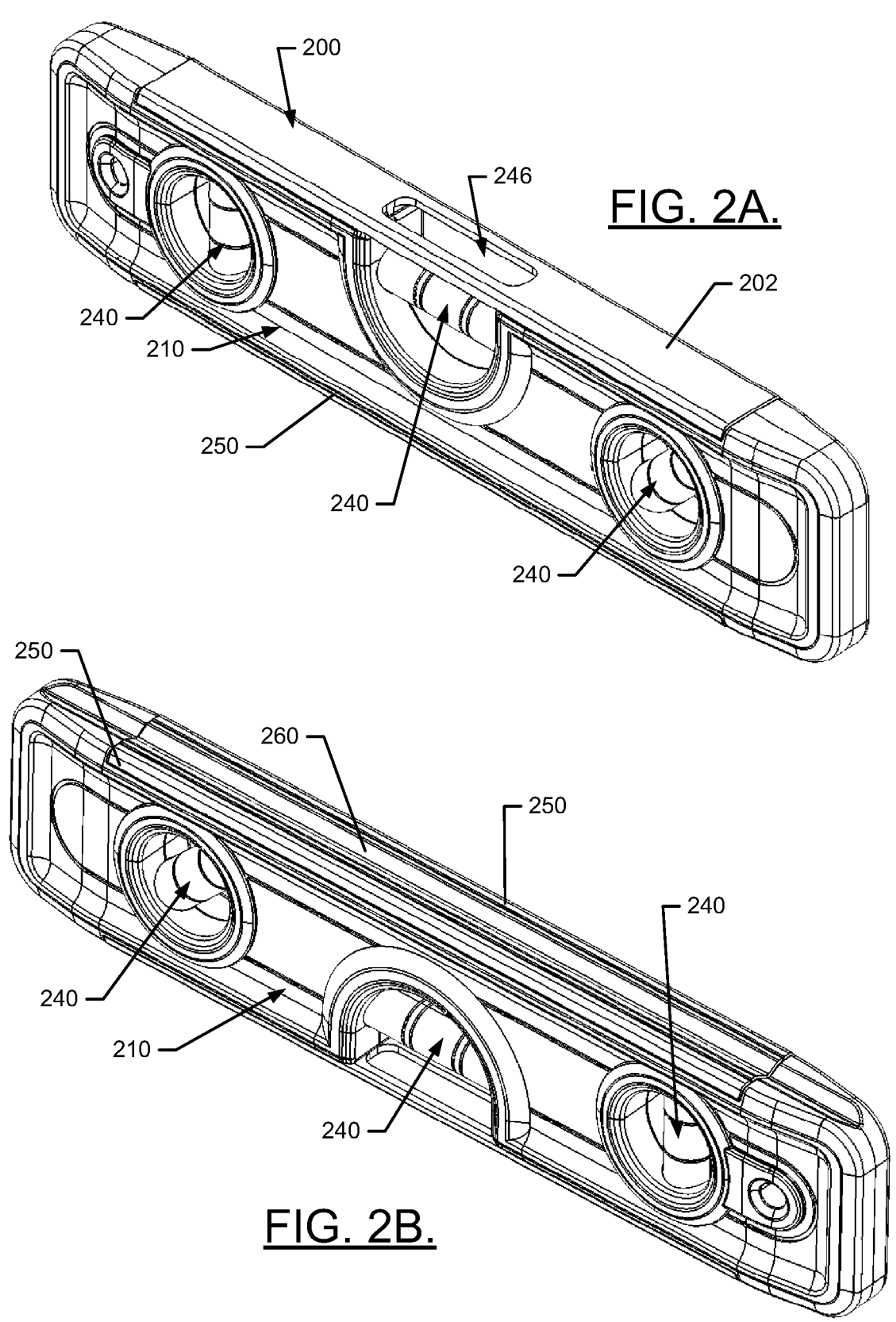
Figures 3A, 3B:
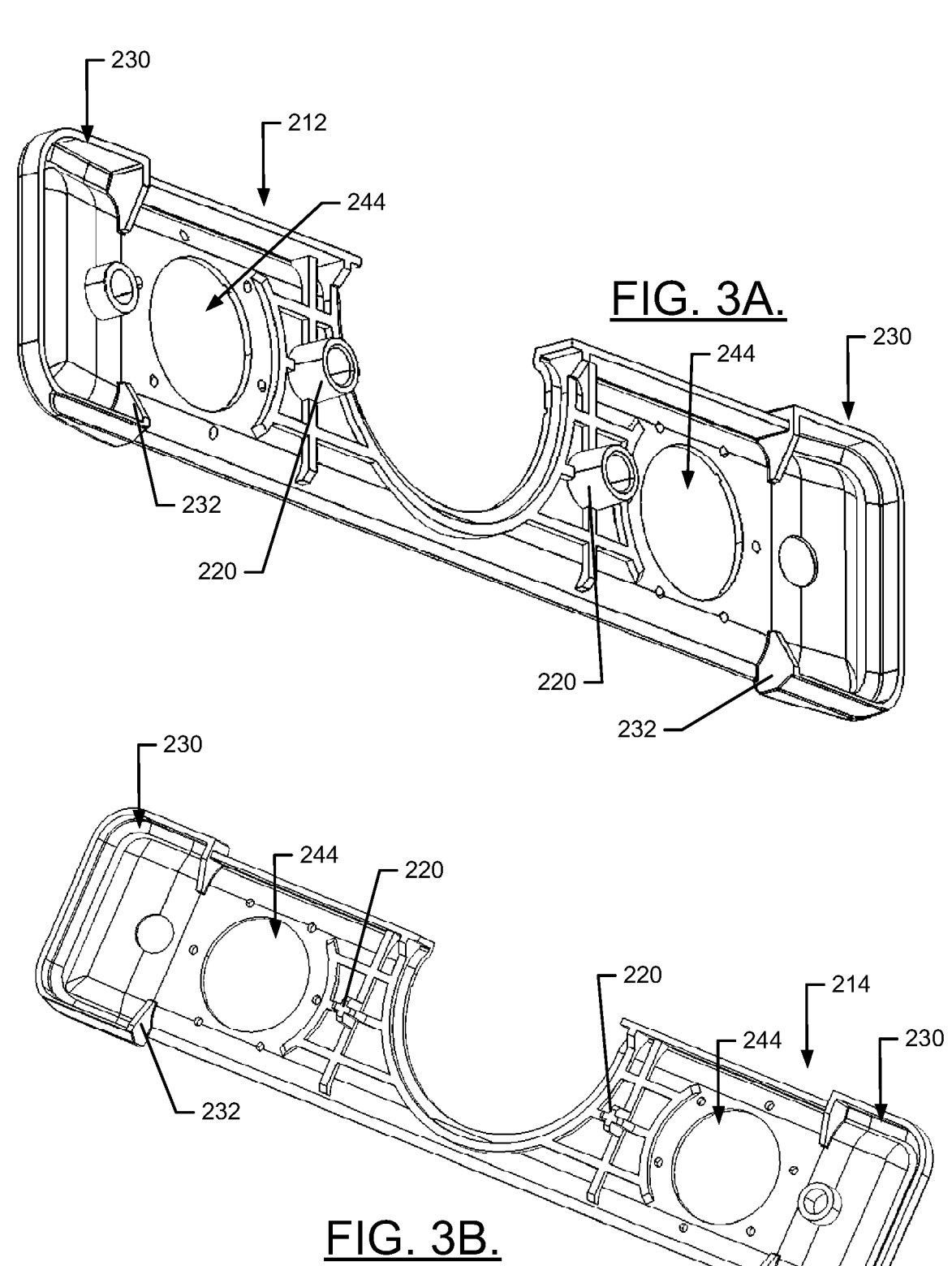
Figures 4A, 4B:
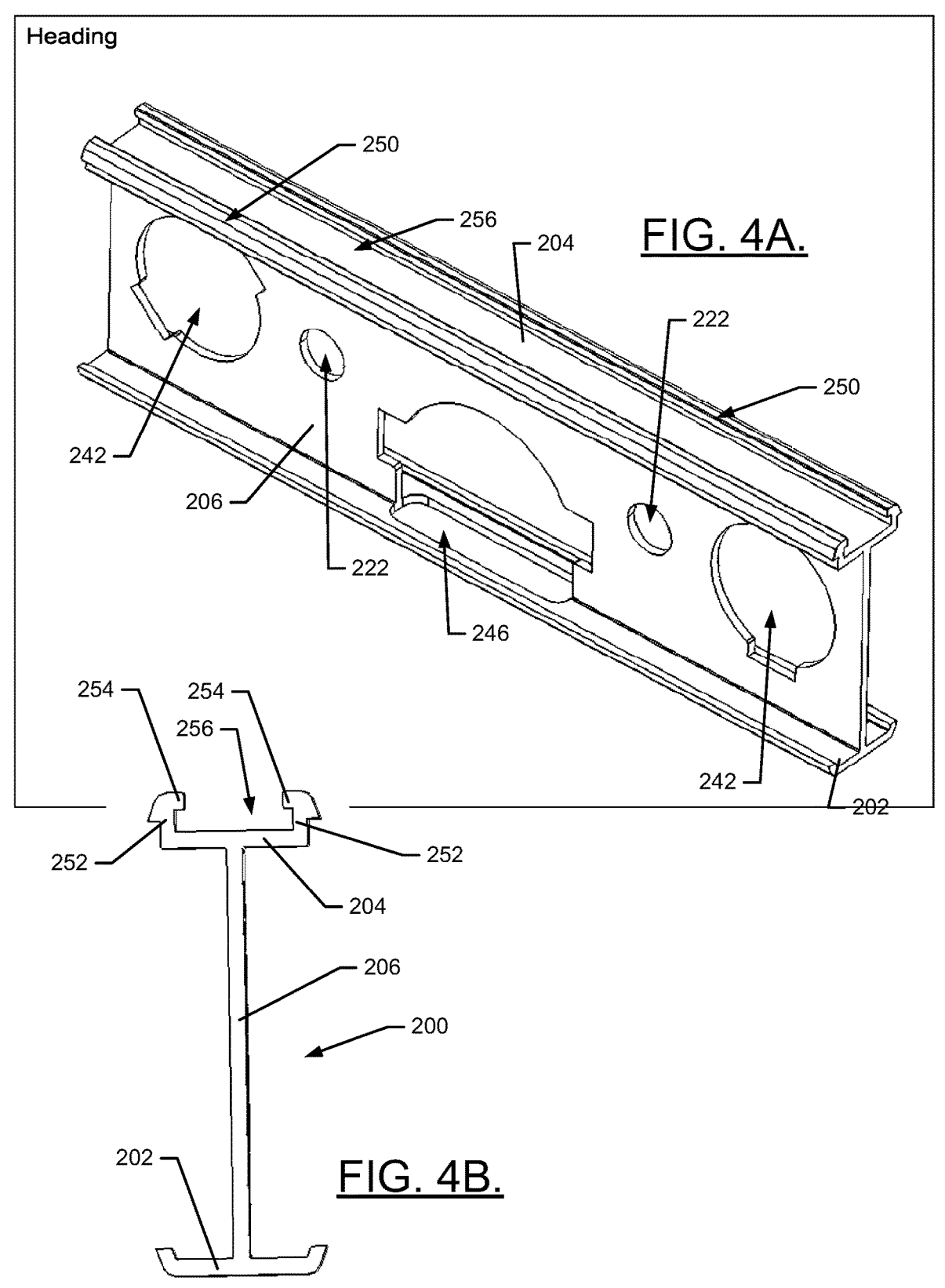
Figures 5A, 5B:
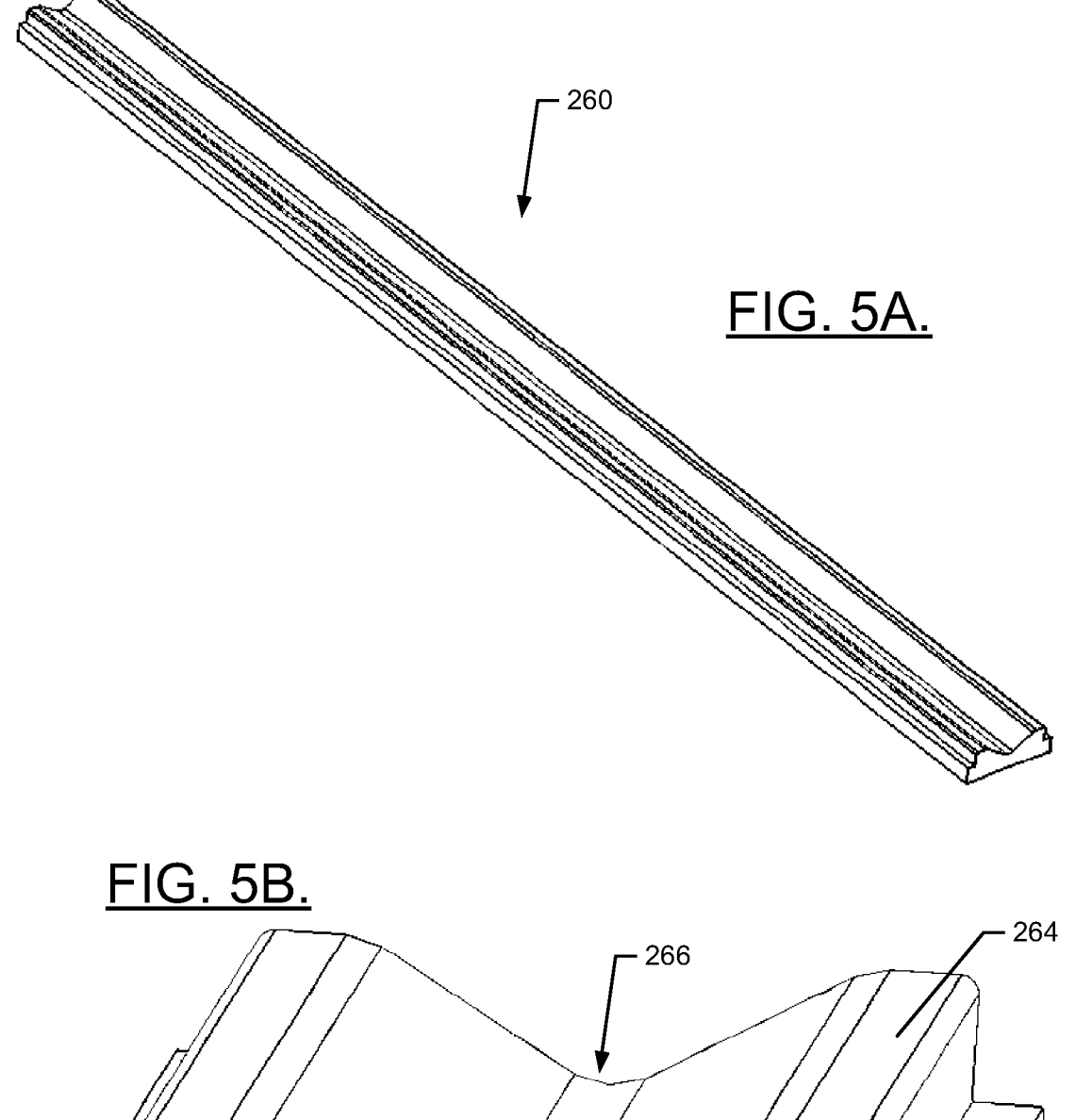
Figure 6:
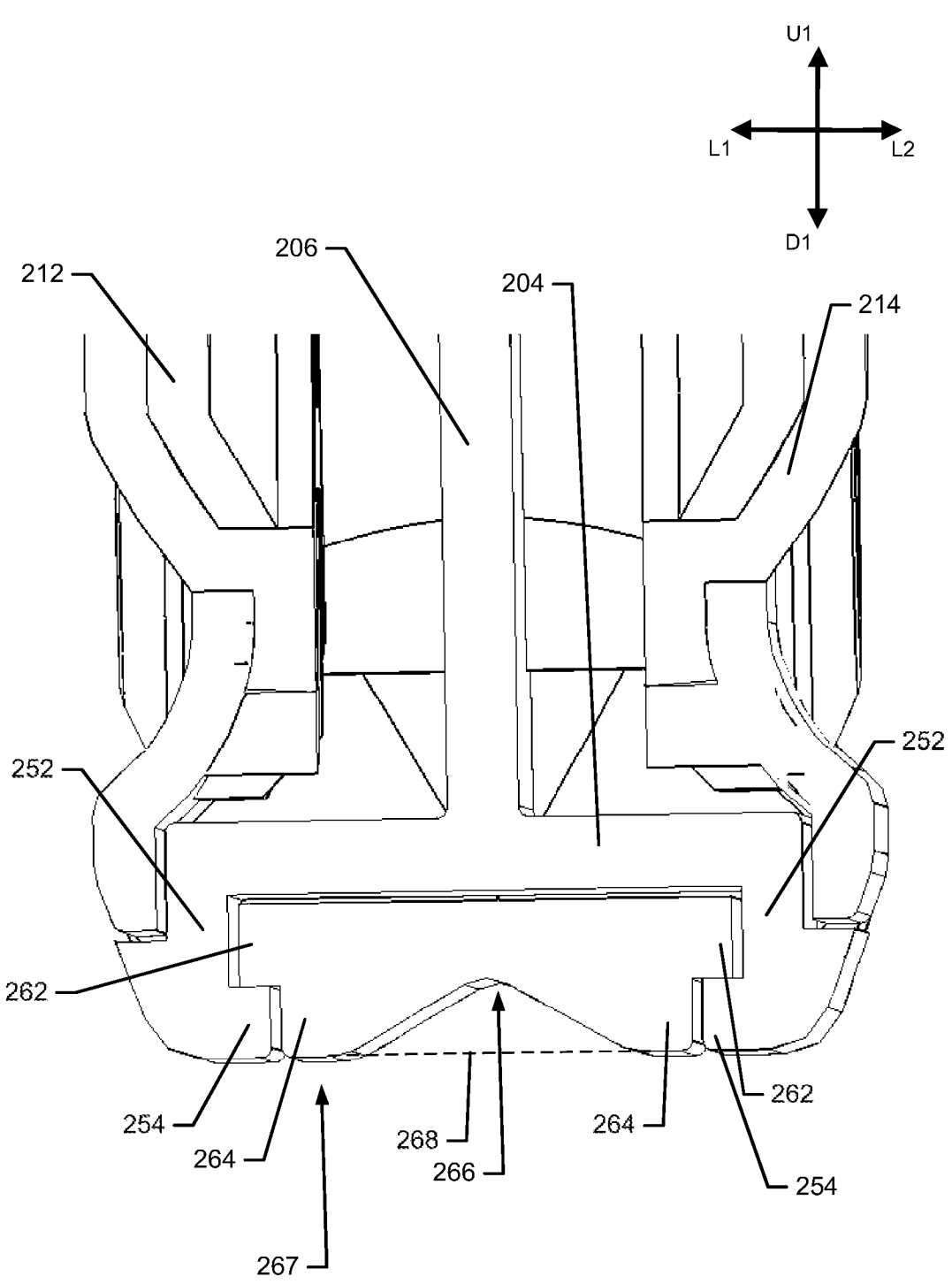

Having thus described some example embodiments in general terms, reference will now be made to the accompanying drawings, which are not necessarily drawn to scale, and wherein:

FIG. 1 illustrates a block diagram of a level device in accordance with an example embodiment;

FIG. 2, which is defined by FIGS. 2A and 2B, illustrates perspective views of one example implementation of the level 100 of FIG. 1 in accordance with an example embodiment;

FIG. 3, which is defined by FIGS. 3A and 3B, shows specific structures associated with the housing of the level in accordance with an example embodiment;

FIG. 4, which is defined by FIGS. 4A and 4B, shows specific structures associated with a capture element in accordance with an example embodiment;

FIG. 5, which is defined by FIGS. 5A and 5B, illustrates an example of magnetic element in accordance with an example embodiment; and FIG. 6 is a cross section view of a channel in which a magnetic element is retained according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may relate to the provision of a level (e.g., a bubble level) that may have an improved configuration by including a capture element that is integrated therein to mechanically capture a magnetic element in a portion of the housing of the level. In this regard, for example, a base portion of the housing of the level may include a capture element that captures lateral sides of the magnetic element (e.g., strip magnet), and the axial ends of the magnetic component may also be retained so that the magnetic component or element is has structure preventing movement in the direction of any of the six sides of the magnetic element. An adhesive could also be employed, but would never be the only means by which to retain the magnetic element. Peeling off of the magnetic element may therefore become virtually impossible without intentionally damaging the level.

FIG. 1 illustrates a block diagram of a level (e.g., a bubble level) of an example embodiment. The level 100 includes a housing 110 that comprises an elongate member having at least one (and typically multiple) flat surfaces forming various edges thereof. In some cases, the elongate member of the housing 110 may be formed as a rectangular prism having a first end 112, a second end 114, a top face 116 and a bottom face 118. The top face 116 and the bottom face 118 may each be substantially flat or planar surfaces that are substantially parallel to each other. The first end 112 and the second end 114 may also lie in planes that are parallel to each other and spaced apart from each other by the length of the top and bottom faces 116 and 118. The planes in which the first and second ends 112 and 114 lie may be substantially perpendicular to the planar surfaces of the top face 116 and the bottom face 118. Although not specifically identified in FIG. 1, the housing 110 may also include a front face and a rear face that are substantially parallel to each other, and substantially perpendicular to the planar surfaces of the top face 116 and the bottom face 118 and the planes in which the first and second ends 112 and 114 lie.

In an example embodiment, the bottom face 118 of the housing 110 may be considered to be a "base" which forms a portion of the housing 110 that is normally placed along-side the surface or component that is being measured for level or plumb. However, it should be appreciated that the top face 116 is generally also flat and parallel to the bottom face 118, and therefore the top face 116 can often serve equally well as a reference plane to be placed alongside the surface or component that is being measured. Moreover, in some cases, although shorter, the first and second ends 112 and 114 may also be formed to have planar surfaces that may (although smaller) be placed alongside a surface or compo-nent being measured for level or plumb.

In an example embodiment, the housing 110 may include a capture element 120 disposed at a portion thereof. In this example, the capture element 120 is formed at the bottom face 118 of the housing 110. However, it should be under-stood that the capture element 120 could alternatively be formed at the front or rear face of the housing 110 or at the top face 116. The capture element 120 may be configured to capture the magnetic element 130 (e.g., a strip magnet) as described in greater detail below. The magnetic element 130 may be understood to be an elongated component generally having six sides. The six sides may include, for example, a top, bottom, two lateral sides opposite each other and extending between the top and bottom sides, along with axial end sides that are again opposite each other at the longitudinal ends of the magnetic element 130. A corre-sponding direction may be defined normal to each of the six sides to define all possible directions of motion for the magnetic element 130. The directions may include upper and lower directions (i.e., normal to the top and bottom sides, respectively). The directions may also include oppos-ing axial directions (i.e., normal to the axial end sides) and opposing lateral directions (i.e., normal to each of the lateral sides).

In an example embodiment, the capture element 120 may fully cover five sides of the magnetic element 130, and may extend around at least a portion of the sixth side. For example, the capture element 120 may fully cover the top side, both lateral sides and both axial end sides. Meanwhile, the capture element 120 may extend over at least a portion of the bottom side, while also leaving remaining portions of the bottom side of the magnetic element 130 exposed. In this way, the magnetic element 130 is restricted in movement in all six directions, and is not able to move in either of the opposing axial directions, opposing lateral directions, or move in the upper or lower directions. The capture element 120 therefore effectively fixes the magnetic element 130 in the housing 110 to prevent any possibility of peeling of the magnetic element 130 off of the housing 110.

The level 100 may also include a vial assembly 140, which may be disposed at any portion (and sometimes include components disposed at multiple portions) of the housing 110. The vial assembly 140 may include one or more instances of a level vial that may be oriented and retained within the housing 110 such that the centering the bubble in the level vial indicates that the top face 116 and/or bottom face 118 is level (and therefore any surface support-ing the housing 110 is also level). In some cases, the vial assembly 140 may also include one or more instances of a plumb vial that may be oriented and retained within the housing 110 such that the centering the bubble in the plumb vial indicates that the top face 116 and/or bottom face 118 is level (and therefore any surface to which the housing 110 is adjacent plumb). Additional vials (e.g., diagonally oriented) may also be added to further enhance the utility of the level 100.

Each vial in the vial assembly 140 may be a cylindrical vial with a liquid therein. The cylindrical vial may have a slightly elevated middle, so a bubble formed in the liquid will tend to sit in the middle of the vial, when the vial is oriented such that a corresponding portion of the housing 110 is level or plumb.

FIG. 2, which is defined by FIGS. 2A and 2B, illustrates perspective views of one example implementation of the level 100 of FIG. 1. Meanwhile, FIG. 3, which is defined by FIGS. 3A and 3B, shows specific structures associated with the housing 110 of the level 100, and FIG. 4, which is defined by FIGS. 4A and 4B, shows specific structures associated with the capture element 120 of FIG. 1. Finally, FIGS. 5A and 5B, illustrate an example of the magnetic element 130 of FIG. 1. FIG. 6 is a cross section view of a channel in which a magnetic element is retained according to an example embodiment.

Referring now to FIGS. 2-6, the housing 110 of FIG. 1 may be instantiated by a frame 200 and a body 210. In this example, the frame 200 may be a metallic component (e.g., aluminum), generally having a I shaped cross section. How-ever, the frame 200 need not necessarily be metallic, and other rigid materials could be substituted in some cases. The frame 200 may include a substantially flat and elongated top portion 202 and a substantially flat and elongated bottom portion 204 that each extend parallel to each other, and are separated from each other by a center beam 206. The center beam 206 may extend from a longitudinal center portion of the top portion 202 to a longitudinal center portion of the bottom portion 204 along respective lengths of the top and bottom portions 202 and 204. Thus, the center beam 206 may extend substantially perpendicular to each of the top portion 202 and the bottom portion 204. In this example, the frame 200 may be made of extruded aluminum so that all of the top portion 202, the bottom portion 204 and the center beam 206 are integrally formed in the extrusion process. However, the top portion 202, the bottom portion 204 and the center beam 206 could alternatively be separate compo-nents that are attached to each other (e.g., via welding or other means).

The body 210 may be formed from molded plastic or other materials that may define opposing case halves that may fit together with each other on opposite sides of the center beam 206. In this regard, as shown in FIG. 3, the body 210 may include a first case half 212 and a second face half 214. The first and second case halves 212 and 214 may include cooperating mechanical structures or fittings 220 that pass through one or more orifices 222 formed in the center beam 206 to engage each other. Snap or friction fittings, adhesives, or other means may be used to connect the first and second case halves 212 and 214 to each other.

In an example embodiment, the first and second case halves 212 and 214 may each extend past the opposing axial ends of the frame 200. In this regard, extension portions 230 may be provided at the axial ends of the first and second case halves 212 and 214. The extension portions 230 may each include a retaining wall 232 at least at a bottom side of each respective one of the first and second case halves 212 and 214. As will be noted below, these retaining walls 232 may combine to lie alongside the axial ends of the bottom portion 204 of the frame 200. The retaining walls 232 may extend to form a plane that lies substantially perpendicular to a direction of longitudinal extension of the bottom portion 204 of the frame 200.

As seen best in FIG. 2, the vial assembly 140 of FIG. 1 may be instantiated by a plurality of vials 240. The vials 240 in this example are inserted into vial orifices 242 and 244, respectively formed in each of the center beam 206 and the first and second case halves 212 and 214. The vials 240 in this example include a level vial, a plumb vial and a diagonal vial. However, more or fewer vials may be included, and the orientations may vary. In this example, the top portion 202 of the frame 200 may also include a viewing orifice 246 formed therein proximate to the level vial (or another vial) to permit viewing of the level vial from above and through the top portion 202.

As shown best in FIG. 4, the capture element 120 of FIG. 1 may be instantiated by a retention arm 250 extending along each lateral edge of the bottom portion 204 of the frame 200. The retention arms 250 may include a sidewall 252 that extends substantially perpendicular to the bottom portion 204 and a retaining lip 254 that extends substantially perpendicularly away from a distal end of each of the sidewalls 252 (relative to the bottom portion 204). Moreover, the retaining lips 254 may extend toward each other. The bottom portion 204 of the frame 200, the sidewalls 252 and the retaining lip 254 may combine to form a channel 256 that extends along the bottom portion 204 and between the sidewalls 252 and retaining lips 254. A strip magnet 260, as an example of the magnetic element 130 of FIG. 1, may be retained in the channel 256 as shown in FIG. 6.

The strip magnet 260 of this example may also be an extruded component. The strip magnet 260 may include a substantially rectangular prism shaped base portion 262 and an interface portion 264 that is exposed between the retaining lips 254. In this example, the interface portion 264 includes a v-shaped groove 266. The groove 266 may be useful for steadying the strip magnet 260 (and consequently the level itself) on pipes or other components. However, it should be appreciated that the groove 266 could be omitted and the interface portion 264 could instead also be rectangular prism shaped (as demonstrated by dashed line 268 in FIG. 6).

The base portion 262 may have a first width (W1) that is slightly smaller than a width defined between the sidewalls 252. Meanwhile, the interface portion 264 may have a second width (W2) that is slightly smaller than a width defined between the retaining lips 254. The second width (W2) may be between about 80% and about 95% of the first width (W1). However, in some cases, the second width (W2) could be as much as 50% to 95% of the first width (W1). This relationship may ensure that an exposed face 267 of the interface portion 264 may be about 80% to about 95% of the total surface area of the face of the base portion 262 that is adjacent the bottom portion 204, and may be a result of the fact that the retaining lips 256 are separated from each other by a smaller distance than the sidewalls 252. In other words, the sidewalls 252 are separated by a first distance that is larger than a second distance, which defines the distance between the retaining lips 254. The interface portion 264 and the base portion 262 may be part of the same unitary piece of material. Thus, the extension of the retaining lips 254 over the base portion 262 may retain the strip magnet 260 in the channel 256. In particular, the retaining lips 254 may ensure that there is no movement of the strip magnet 260 that is possible in a downward direction (D1), upward direction (U1), or in either lateral direction (L1) and (L2). Meanwhile, movement of the magnetic strip 260 in either axial direction (i.e., into the page as shown in FIG. 6, or out of the page) is prevented by the location of the retaining walls 232 disposed at the axial ends of the channel 256. As such, although the retaining walls 232 may be part of the body 210

(and an example of part of the housing 110 of FIG. 1), the retaining walls 232 may also form a portion of the capture element 120 of FIG. 1.

In an example embodiment, the magnetic strip 260 may be slid into the channel 256 from one of the axial ends of the channel 256. Thereafter, the first and second case halves 212 and 214 may be affixed to each other to form the retaining walls 232 at the respective opposing axial ends of the channel 256 to prevent any movement of the magnetic strip 260 in the axial direction. The magnetic strip 260 is therefore bounded on all six sides, albeit with a significant amount of exposure of the magnetic strip 260 provided on one side. The bounding on six sides may ensure that no peeling of the magnetic strip 260 off of the bottom portion 204 is possible. Notably, although an adhesive may be placed between the base portion 262 and the bottom portion 204, no such adhesive is required.

In an example embodiment, a level (e.g., a bubble level) device may be provided. The level device may include a magnetic element, a vial assembly and a housing having a top face, a bottom face, a first end and a second end. The housing may include a capture element disposed at the bottom face or the top face. The vial assembly may include one or more spirit or bubble levels disposed in the housing to indicate conditions of level or plumb relative to orientation of the top or bottom faces. The magnetic element may be retained by the capture element. The magnetic element may be retained on six sides by the capture element.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the housing may include a frame and a body. The capture element may include retention arms disposed to extend away from the frame and include retaining lips that prevent movement of the magnetic element away from the frame. In an example embodiment, the retention arms may be formed at a bottom portion of the frame, where the bottom portion extends along a length of the magnetic element. The retention arms may include sidewalls that extend substantially perpendicular to the bottom portion from opposing lateral edges of the bottom portion. The retention arms may further include the retaining lips, which extend toward each other from the retention arms on the opposing lateral edges of the bottom portion to form a channel between the sidewalls, the bottom portion and the retaining lips. In some cases, the magnetic element may include a base portion disposed in the channel, and an interface portion disposed between the retaining lips. In an example embodiment, the magnetic element may be an extruded strip magnet such that the base portion and the interface portion are integrally formed. The base portion may have a first width and the interface portion has a smaller second width. In some cases, the interface portion may have a v-shaped groove formed therein, and the groove may extend along a full length of the interface portion. In an example embodiment, the sidewalls may define a first width therebetween and the retaining lips may define a second width therebetween. The second width may be between about 80% and about 95% of the first width. In some cases, the bottom portion of the frame may prevent movement of the magnetic element in a first direction. The sidewalls may be configured to prevent movement of the magnetic element in a second direction and a third direction. The second and third directions may be opposite each other and perpendicular to the first direction. The retention lips may prevent movement of the magnetic element in a fourth direction opposite the first direction. In an example embodiment, the body may include retaining walls that may define planar surfaces that extend substantially perpendicular to a longitudinal length of the bottom portion. In some cases, the retaining walls may be disposed at respective opposing ends of the channel to prevent movement of the magnetic element in a fifth direction and a sixth direction, the fifth and sixth directions being opposite each other and perpendicular to the first, second, third and fourth directions. In an example embodiment, the body may include a first case half disposed on a first side of the frame and a second case half disposed on a second side of the frame, and the retaining walls may be formed by parts of each of the first and second case halves. In some cases, the frame may include an I shaped cross section having a top portion that extends parallel to the bottom portion and a center beam extending between longitudinal centers of the top portion and the bottom portion. In an example embodiment, the center beam may include one or more orifices through which fittings of the first and second case halves engage each other. In some cases, the center beam may include one or more vial orifices to receive the one or more spirit or bubble levels of the vial assembly. In an example embodiment, the top portion may include a viewing orifice through which one of the one or more spirit or bubble levels is visible. In some cases, the retention arms and retaining lips may extend along opposing lateral sides of an entire length of the magnetic element. In an example embodiment, the capture element may be configured to fully cover the magnetic element on five sides. In some cases, the capture element may be configured to leave about 50% to about 95% of a sixth side of the magnetic element exposed. In an example embodiment, an adhesive may be disposed in the capture element. In some cases, the adhesive may be provided between the bottom portion and the magnetic element.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A level device comprising:
a housing having a top face, a bottom face, a first end and a second end, the housing comprising a capture element disposed at the bottom face or the top face;
a vial assembly comprising one or more spirit or bubble levels disposed in the housing to indicate conditions of level or plumb relative to orientation of the top or bottom faces; and
a magnetic element retained by the capture element, wherein the magnetic element is retained on six sides by the capture element.

2. The device of claim 1, wherein the housing comprises a frame and a body, and
wherein the capture element comprises retention arms disposed to extend away from the frame and include retaining lips that prevent movement of the magnetic element away from the frame.

3. The device of claim 2, wherein the retention arms are formed at a bottom portion of the frame, the bottom portion extending along a length of the magnetic element,
wherein the retention arms include sidewalls that extend substantially perpendicular to the bottom portion from opposing lateral edges of the bottom portion,
wherein the retention arms further include the retaining lips, which extend toward each other from the retention arms on the opposing lateral edges of the bottom portion to form a channel between the sidewalls, the bottom portion and the retaining lips.

4. The device of claim 3, wherein the magnetic element includes a base portion disposed in the channel, and an interface portion disposed between the retaining lips.

5. The device of claim 4, wherein the magnetic element is an extruded strip magnet such that the base portion and the interface portion are integrally formed, and
wherein the base portion has a first width and the interface portion has a smaller second width.

6. The device of claim 5, wherein the interface portion has a v-shaped groove formed therein, the groove extending along a full length of the interface portion.

7. The device of claim 4, wherein the sidewalls define a first width therebetween and the retaining lips define a second width therebetween, and
wherein the second width is between about 50% and about 95% of the first width.

8. The device of claim 3, wherein the bottom portion of the frame prevents movement of the magnetic element in a first direction,
wherein the sidewalls prevent movement of the magnetic element in a second direction and a third direction, the second and third directions being opposite each other and perpendicular to the first direction, and
wherein the retention lips prevent movement of the magnetic element in a fourth direction opposite the first direction.

9. The device of claim 8, wherein the body comprises retaining walls, the retaining walls defining planar surfaces that extend substantially perpendicular to a longitudinal length of the bottom portion.

10. The device of claim 9, wherein the retaining walls are disposed at respective opposing ends of the channel to prevent movement of the magnetic element in a fifth direction and a sixth direction, the fifth and sixth directions being opposite each other and perpendicular to the first, second, third and fourth directions.

11. The device of claim 9, wherein the body comprises a first case half disposed on a first side of the frame and a second case half disposed on a second side of the frame, and
  wherein the retaining walls are formed by parts of each of the first and second case halves.

12. The device of claim 11 wherein the frame comprises an I shaped cross section including a top portion that extends parallel to the bottom portion and a center beam extending between longitudinal centers of the top portion and the bottom portion.

13. The device of claim 12, wherein the center beam includes one or more orifices through which fittings of the first and second case halves engage each other.

14. The device of claim 13, wherein the center beam includes one or more vial orifices to receive the one or more spirit or bubble levels of the vial assembly.

15. The device of claim 12, wherein the top portion comprises a viewing orifice through which one of the one or more spirit or bubble levels is visible.

16. The device of claim 2, wherein the retention arms and retaining lips extend along opposing lateral sides of an entire length of the magnetic element.

17. The device of claim 2, wherein the capture element is configured to fully cover the magnetic element on five sides.

18. The device of claim 17, wherein the capture element is configured to leave about 50% to about 95% of a sixth side of the magnetic element exposed.

19. The device of claim 17, wherein an adhesive is disposed in the capture element.

20. The device of claim 19, wherein the adhesive is provided between the bottom portion and the magnetic element.

* * * * *